US006956522B2

(12) United States Patent
Gottwald

(10) Patent No.: US 6,956,522 B2
(45) Date of Patent: Oct. 18, 2005

(54) PULSE RADAR SYSTEM

(75) Inventor: Frank Gottwald, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/488,170

(22) PCT Filed: Jun. 21, 2002

(86) PCT No.: PCT/DE02/02295

§ 371 (c)(1),
(2), (4) Date: Aug. 6, 2004

(87) PCT Pub. No.: WO03/027707

PCT Pub. Date: Apr. 3, 2003

(65) Prior Publication Data

US 2004/0263382 A1 Dec. 30, 2004

(30) Foreign Application Priority Data

Aug. 29, 2001 (DE) .......................................... 101 42 172

(51) Int. Cl.⁷ ............................................... G01S 7/28
(52) U.S. Cl. ......................... 342/70; 342/127; 342/132; 342/134; 342/137
(58) Field of Search .................. 342/70, 118, 127–132, 342/135, 137, 145, 201–203, 134

(56) References Cited

U.S. PATENT DOCUMENTS

| 2,548,779 | A | * | 4/1951 | Emslie | 342/163 |
| 3,161,874 | A | * | 12/1964 | Page | 342/160 |
| 4,096,478 | A | * | 6/1978 | Chavez | 342/132 |
| 4,552,456 | A | * | 11/1985 | Endo | 356/5.06 |
| 5,268,692 | A | * | 12/1993 | Grosch et al. | 342/70 |
| 5,539,410 | A |   | 7/1996 | Zveglich | 342/68 |
| 5,731,781 | A | * | 3/1998 | Reed | 342/135 |
| 6,067,040 | A | * | 5/2000 | Puglia | 342/134 |
| 6,693,582 | B2 | * | 2/2004 | Steinlechner et al. | 342/70 |

FOREIGN PATENT DOCUMENTS

DE 199 26 787 1/2001

* cited by examiner

Primary Examiner—John B. Sotomayor
(74) Attorney, Agent, or Firm—Kenyon & Kenyon

(57) ABSTRACT

A pulse radar system has a high-frequency source, which supplies a continuous high-frequency signal and is connected on the one side to a transmission-side pulse modulator and on the other side to at least one mixer in at least one receive path. A pulse modulator is connected upstream of the mixer with regard to its connection to a receiving antenna. The mixer evaluates a radar pulse reflected by an object together with the signal of the high-frequency source. This system does not require a ZO switch and is insensitive to interference.

16 Claims, 3 Drawing Sheets

PULSE RADAR SYSTEM

FIELD OF THE INVENTION

The present invention relates to a pulse radar system, in particular for close-range pulse radar applications in motor vehicles.

BACKGROUND INFORMATION

Radar sensors are used in automotive engineering for measuring the distance to objects and/or the relative speed with respect to such objects outside of the motor vehicle. Examples of objects include preceding or parked motor vehicles, pedestrians, bicyclists, or devices within the vehicle's surroundings. The pulse radar functions, for example, at 24.125 GHz and may be used for the following functions, stop & go, precrash, blind spot detection, parking assistant, and backup aid.

FIG. 1 shows a schematic representation of a conventional radar system having a correlation receiver. A pulse generation 302 causes a transmitter 300 to transmit a transmission signal 306 via an antenna 304. Transmission signal 306 hits a target object 308, where it is reflected. The receiving signal 310 is received by antenna 312. This antenna 312 may be identical to antenna 304. After received signal 310 is received by antenna 312, the signal is transmitted to receiver 314 and subsequently supplied via a unit 316 having low pass and analog/digital conversion to a signal evaluation 318. The special feature of a correlation receiver is that receiver 314 receives a reference signal 320 from pulse generation 302. Receiving signals 310 which are received by receiver 314 are mixed in receiver 314 with reference signal 320. As a result of the correlation, conclusions may be drawn, for instance, as to the distance of a target object, on the basis of the temporal delay between the transmitting and receiving of the radar impulses.

A similar radar device is described in German Patent Application No. DE 199 26 787. In this context, a transmission switch is switched on and off by the impulses of a generator so that a high-frequency wave generated by an oscillator and conducted via a termination hybrid to the transmission switch is switched through to the transmission antenna during the pulse duration. A reception unit also receives the output signal of the generator. The received signal, i.e., a radar pulse reflected by an object, is combined with the oscillator signal, which reaches the mixer via a reception switch, and evaluated during a predefined time window.

U.S. Pat. No. 6,067,040 also uses a transmission switch that is switched on and off by generator impulses. Separate paths for I and Q signals are provided for reception of the reflected radar pulses. Also in this instance, the received signal is only mixed and evaluated during a predefined time window. Both in the radar device according to DE 199 26 787 and in U.S. Pat. No. 6,067,040, the generator signal first reaches a reception switch/pulse modulator.

SUMMARY

The measures of the example embodiments of the present invention make possible a continuous control of the mixer(s) on the reception side, which has the advantage that changes in the radar pulses and their gating does not have a disadvantageous effect on the mixers and their operating points.

Since the mixer(s) are continuously activated by a high frequency source, compared to the solutions according to DE 199 26 787 or U.S. Pat. No. 6,067,040, an LO (local oscillator)- modulator or an LO high frequency switch are omitted, and there are no LO pulses. Consequently, changes of pulse modulators, and their activation have no effect on the mixers and their operating points.

The pulse radar device according to the present invention is able to be broadened to cover several receiving paths, whereas the high frequency source for controlling the mixers on the receiving side has to be provided only once.

Because the design has several receive paths, various distance cells may be evaluated simultaneously. A flexible change of the operating manner may be undertaken:

- a plurality of receiving channels may be operated in parallel,
- I/Q demodulator operation and individual operation are possible,
- a plurality of antennas may be operated in parallel (multi-receiver principle),
- the pulse duty factors may be selected to be different in the transmit and receive path,
- the pulse duty factor in the receiving range may be one (pure pulse Doppler radar),
- The radar pulses may vary with respect to their repetition frequency and/or pulse duration to increase the interference protection,
- the power of the reception pulses may be split among a plurality of receive paths in the case of target objects that are too strong in close range, so that overloading of subsequent received-signal amplifiers is prevented,
- a PN code may be provided with a reception sequence corresponding to the set distance,
- a cross echo analysis is possible, and
- the superimposition of two orthogonal codes in the transmit path may be provided as well as evaluation of, in each case, only one of the transmitted orthogonal codes per receive path on the reception side.

BRIEF DESCRIPTION OF THE DRAWINGS

The exemplary embodiments of the present invention are explained in greater detail on the basis of the figures.

DESCRIPTION OF EXAMPLE EMBODIMENTS

Figure 1:
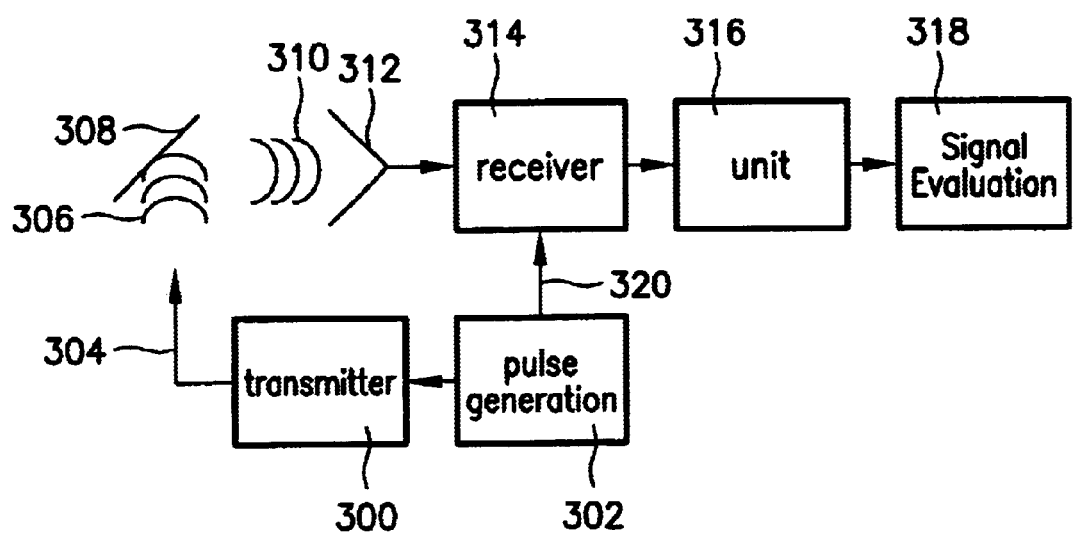
Figure 2:
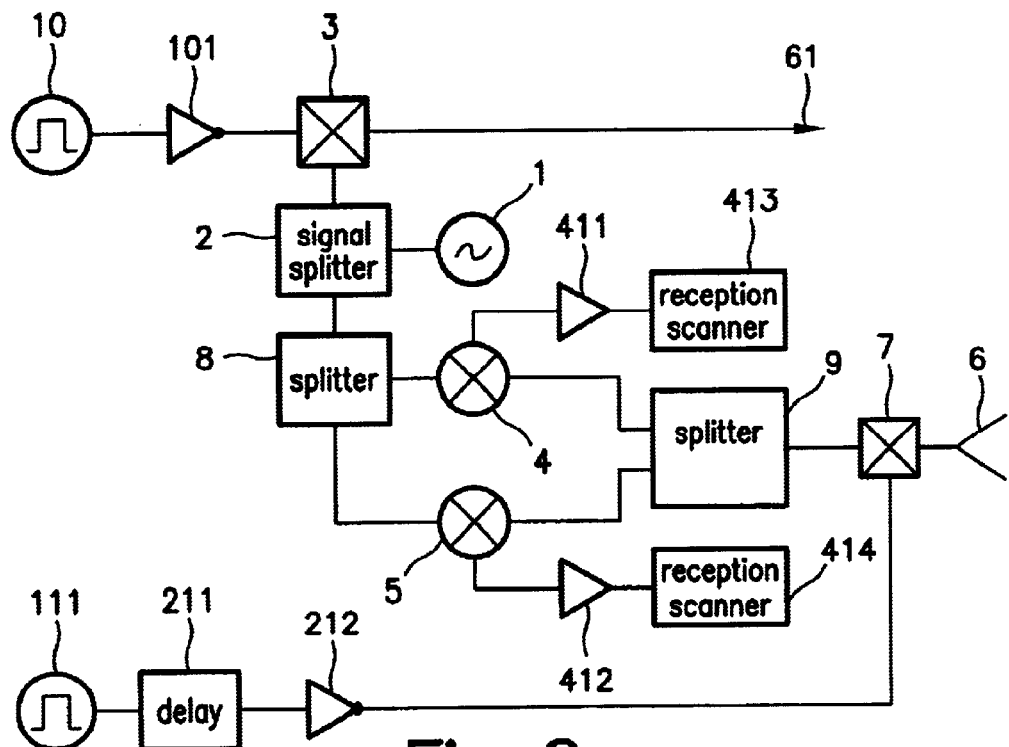
FIG. 2 shows a block diagram of a pulse radar system according to an example embodiment of the present invention.

The radar sensor according to an example embodiment of the present invention shown in FIG. 2 has a high-frequency source 1, which provides a continuous high-frequency signal (CW signal). Via a signal splitter in the form of a termination hybrid 2, this high-frequency signal reaches on the one side the input of a transmission-side pulse modulator 3 for transmitting radar impulses to transmission antenna 61 and on the other side via a further signal splitter 8 directly to the inputs of two mixers 4 and 5. The additional inputs of these mixers are then connected via a power splitter 9, e.g., a 3 dB signal splitter, to receiving antenna 6. In this exemplary embodiment, two mixers 4 and 5 are provided, in order to achieve an I/Q (inphase/quadrature phase) capability of the radar system. Signal splitter 9 is used for splitting the antenna signals on the reception side into the quadrature component signals I and Q. If one wishes to do without the I/Q capability, a mixer is sufficient. Then, of course, subassemblies 8 and 9 are also not needed. Mixers 4 and 5 are designed, for example, as balanced mixers in the form of a RAT-RACE hybrid (compare this in particular to European EP 685930 Al, which describes the configuration of such a RAT-RACE hybrid).

Transmission-side pulse modulator/switch 3 is controlled via a pulse signal source 10 and a transmission gate circuit 101. A common pulse modulator 7 is assigned to the two mixers 4 and 5, and it is positioned in the receive path between antenna 6 and the additional signal splitter 9. The control of this pulse modulator 7 is performed starting from pulse signal source 111 via a delay circuit 211 and a receiving circuit arrangement 212.

If a radar pulse reflected by an object travels from antenna 6 across power splitter 9 to mixers 4 or 5, the envelope curve of the received pulse (IF signal) is formed from the continuous signal of the high-frequency source and the reflected radar pulse during the time in which the pulse modulator allows the signal of high-frequency source 1 to pass. This mixed signal/envelope curve is amplified by broadband ZF amplifiers 411 or 412 with a bandwidth of, e.g., 1 MHz to 1 GHz, and supplied to a reception scanner 413 or 414. This occurs separately for the I and the Q channel (separate receive and evaluation paths for the received I and Q signal). In this context, mixer 4 and possibly also mixer 5 has to have a ZF bandwidth of likewise 1 GHz, in order not to widen the reflected radar pulse and thereby lose the object resolution.

Time-delay circuit 211 is necessary to be able to compare the duration of the received radar pulse and to obtain distance information therefrom. After a defined time period following the generation of the transmission pulse that corresponds with the pulse duration for the desired distance cell, a particularly short scanning pulse is applied to a broadband scanner 413 and 414, respectively, and the scanner scans the output signal of ZF amplifier 411 and 412, respectively, in the selected distance cell. In this context, the duration of the scanning pulse is in the order of magnitude of the transmission pulse width and the ZF pulse width. This occurs at the rate of transmission pulse generation, only accordingly delayed. The variation in delay time allows the scanning of the desired distance range in the same manner as SRR (short range radar). The scanner detects voltages different from 0 and thus detects the pulse return after the desired duration. Noncoherent pulse integration is possible which improves the signal to noise ratio proportionally to SQRT (n), n being the number of integrated pulses.

Figure 3:
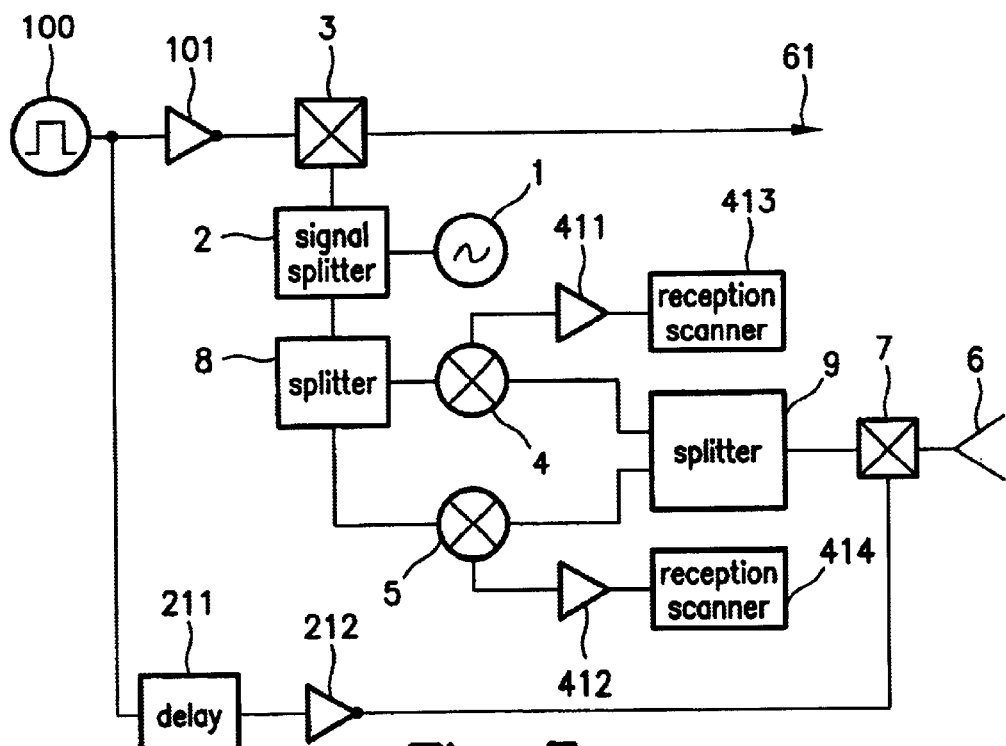
FIG. 3 shows a block diagram of a pulse radar system having common pulse processing.

The preparation of the scanning pulses for scanners 413 and 414, as well as the control pulses for pulse modulators 3 and 7 may, according to FIG. 3, also jointly take place by a shared pulse signal source 100.

The following additional advantages are yielded by the architecture of the pulse radar device according to the present invention:

Because the signal of high frequency source 1 is constantly present as a CW signal at mixer 4 and 5, respectively, and is not pulsed as in the case of the SRR, a substantial improvement comes about in the noise figure, and therewith the possibility of effectively widening the detection range. Besides that, no disadvantageous displacements can occur in the operating points of the mixers by preconnected pulse modulators/pulse switches.

Figure 4:
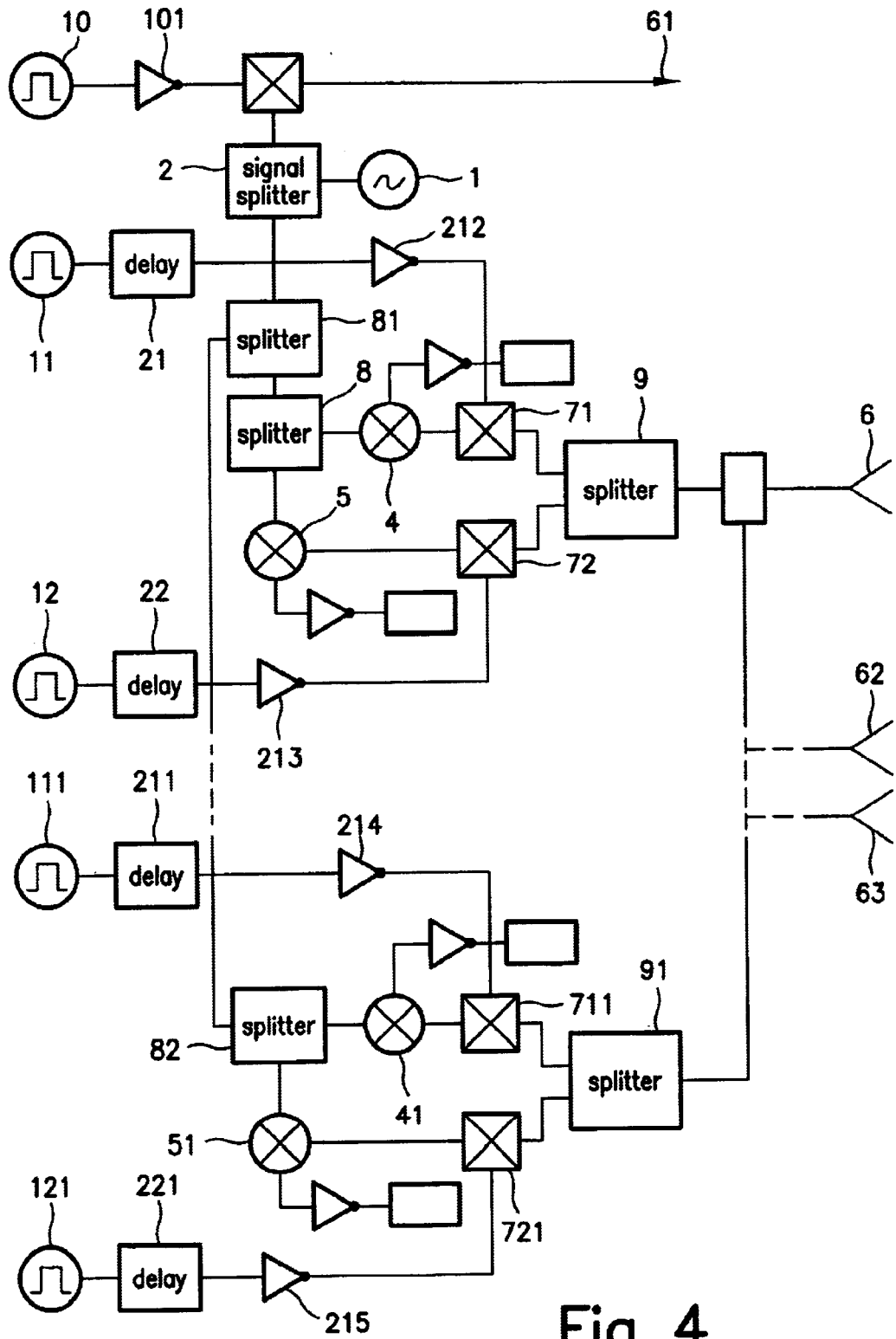
FIG. 4 shows a block diagram of a pulse radar system according to the present invention having a plurality of receive paths.

FIG. 4 shows an exemplary embodiment having a plurality of receive paths, two in this particular instance. The individual receive paths may be configured as shown in FIG. 2 or 3. However, in order to point out additional design variants of the present invention, the receive paths shown in FIG. 4, in deviation from FIGS. 2 and 3, have the following differences:

Instead of a common pulse modulator 7 on the receive side, each mixer 4, 5 and 41, 51, respectively, has a separate pulse modulator 71, 72 and 711, 721, respectively, which may be controlled independently of the respective other mixers of the same receive path via a corresponding pulse signal source 11, 12 and 111, 121, respectively, a time-delay circuit 21, 22 and 211, 221, respectively, and a reception gate 212, 213 and 214, 215, respectively. The individual receive paths may have at their disposal either a common receiving antenna 61 or each have separate receiving antennas 61, 62, 63. Additional downstream signal splitters 81, 82 are required to connect mixers 41, 51 of the further receive paths to high-frequency source 1, which is shared by all receive paths.

As a result of the at least two receive paths and separate control of reception-side pulse modulators 71, 72 and 711, 712, respectively, each having adjustable time-delay circuits 21, 22, 211, 221 at different delay times, different modes of operation are possible as well as a faster change between these different modes of operation as a function of the needs of the vehicle operator. As a result, in particular

- a plurality of channels (mixers) may be operated in parallel,
- a plurality of antennas may be operated in parallel (multi-receiver principle),
- the pulse duty ratio may be selected to be different in the transmission and receive path(s);
- the pulse duty factor may be one (pure pulse Doppler radar),
- the transmission pulses may be varied in their repetition frequency and/or pulse duration particularly for increasing the interference protection,
- I/Q demodulator operation and individual channel operation are possible,
- in response to using double or triple transmission pulse power, at the same sensitivity, a plurality of reception cells may be evaluated at the same time using appropriate algorithms for discovering objects,
- the distance cells may be adjusted by scanning or masking out the received signal,
- the reception pulse power may be split in the case of target objects that are too strong in close range so that in particular overloading of subsequent amplifiers is prevented, and
- a cross echo analysis is possible.

If coded sequences of pulses (PN coding) are transmitted, the modulators in the receive paths, in this case, for example, phase rotators, are controlled by a reception sequence corresponding to the set distance. This contributes significantly to the suppression of false targets. The channels monitor different distance ranges.

In the event that a reception-side device is set to the PN code of a neighboring device, a cross echo analysis is possible.

Superimposition of two orthogonal codes may be provided in the transmit path, and in each case only one of the transmitted orthogonal signals is evaluated per receive path.

The transmission-side and reception-side pulse signal sources 10, 100, 11, 12, 111, 121 or only the reception-side pulse signal sources 11, 12, 111, 121 among one another are phase-coupled with one another, particularly in the case of a plurality of receive paths, in order to achieve specified time relationships particularly for the simultaneous monitoring of a plurality of reception cells.

What is claimed is:

1. A pulse radar system for a close-range pulse radar application for a motor vehicle, comprising:
   a continuous wave high-frequency source configured to emit a continuous high-frequency signal;
   a signal splitter, the high-frequency source being connected to the signal splitter;
   a transmission-side pulse modulator configured to emit radar pulses, a first side of the signal splitter being in contact with the transmission-side pulse modulator;
   at least one mixer in at least one receive path, a second side of the signal splitter being in contact with the least one mixer, the at least one mixer being directly controlled by the continuous high-frequency signal of the high frequency source for an evaluation of at least one reception signal, which is made up of at least one radar pulse reflected by an object; and
   a reception-side pulse modulator connected upstream of the at least one mixer with respect to a connection to a receiving antenna.

2. The pulse radar system as recited in claim 1, wherein the at least one mixer includes at least two mixers in the receive path, the at least two mixers being connected via an additional signal splitter to the high-frequency source.

3. The pulse radar device as recited in claim 2, further comprising:
   a further signal splitter to transmit quadrature component signals connected upstream of the at least two mixers, with respect to their connection to the receiving antenna.

4. The pulse radar device as recited in claim 2, further comprising:
   a separate reception-side pulse modulator connected upstream of each of the at least two mixers in the receive path, with respect to their connection to the receiving antenna.

5. The pulse radar device as recited in claim 4, wherein each respective one of the reception-side pulse modulators being controllable via a separate pulse signal source, time-delay elements having different delay times being provided between the pulse signal sources and the respective reception-side pulse modulators.

6. The pulse radar device as recited in claim 1, further comprising:
   a pulse signal source, the transmission-side pulse modulator being controllable by the pulse signal source, at least one of a repetition frequency and a pulse duration of the pulse signal source being variable for increasing interference protection.

7. The pulse radar system as recited in claim 1, wherein at least one further receive path is provided having corresponding receiving antennas, corresponding reception-side mixers, and corresponding reception-side pulse modulators.

8. The pulse radar system as recited in claim 7, wherein the at least one further receive path further includes corresponding signal splitters and corresponding pulse signal sources.

9. The pulse radar system as recited in claim 7, wherein connection of the corresponding reception-side mixers of the further receive paths takes place via additional signal splitters which are downstream from the high-frequency signal source.

10. The pulse radar system as recited in claim 7, wherein a plurality of distance cells are able to be evaluated at the same time by corresponding evaluation devices.

11. The pulse radar device as recited in claim 1, where the transmission-side pulse signal source and the reception-side pulse signal source are phase-coupled with one another.

12. The pulse radar device as recited in claim 7, wherein the corresponding reception-side pulse signal sources are phase-coupled with one another.

13. The pulse radar system as recited in claim 1, wherein a pulse duty factor of the radar pulses in a transmit path and in the receive path are different.

14. A pulse radar system for a close-range pulse radar application for a motor vehicle comprising:
   a high-frequency source configured to emit a continuous high-frequency signal;
   a signal splitter, the high-frequency source being connected to the signal splitter;
   a transmission-side pulse modulator configured to emit radar pulses, a first side of the signal splitter being in contact with the transmission-side pulse modulator;
   at least one mixer in at least one receive path, a second side of the signal splitter being in contact with the least one mixer, the at least one mixer being controlled by the continuous high-frequency signal of the high frequency source for an evaluation of at least one reception signal, which is made up of at least one radar pulse reflected by an object; and
   a reception-side pulse modulator connected upstream of the at least one mixer with respect to a connection to a receiving antenna;
   wherein at least one further receive path is provided having corresponding receiving antennas, corresponding reception-side mixers, and corresponding reception-side pulse modulators, and
   wherein radar pulses are P.N. coded, the corresponding reception-side pulse modulators being controllable using a reception sequence corresponding to a set distance.

15. The pulse radar system as recited in claim 14, wherein a cross echo analysis is provided, a reception-side device being set to a P.N. code of a neighboring device.

16. A pulse radar system for a close-range pulse radar application for a motor vehicle comprising:
   a high-frequency source configured to emit a continuous high-frequency signal; a signal splitter, the high-frequency source being connected to the signal splitter;
   a transmission-side pulse modulator configured to emit radar pulses, a first side of the signal splitter being in contact with the transmission-side pulse modulator;
   at least one mixer in at least one receive path, a second side of the signal splitter being in contact with the least one mixer, the at least one mixer being controlled by the continuous high-frequency signal of the high frequency source for an evaluation of at least one reception signal, which is made up of at least one radar pulse reflected by an object; and
   a reception-side pulse modulator connected upstream of the at least one mixer with respect to a connection to a receiving antenna;
   wherein a superimposition of two orthogonal codes is provided in a transmit path, and the receive path evaluates in each case only one of the transmitted orthogonal signals.

* * * * *